United States Patent
Shen (10) Patent No.: US 10,455,064 B2
(45) Date of Patent: Oct. 22, 2019

(54) PACKET SLICING METHOD AND APPARATUS, AND COMPUTER-READABLE MEDIUM

(71) Applicant: SANECHIPS TECHNOLOGY CO., LTD., Shenzhen, Guangdong (CN)

(72) Inventor: Yaming Shen, Shenzhen (CN)

(73) Assignee: Sanechips Technology Co., Ltd., Shenzhen, Guangdong Province (CN)

( * ) Notice: Subject to any disclaimer, the term of this patent is extended or adjusted under 35 U.S.C. 154(b) by 53 days.

(21) Appl. No.: 15/745,546

(22) PCT Filed: May 30, 2016

(86) PCT No.: PCT/CN2016/083907
§ 371 (c)(1),
(2) Date: Jan. 17, 2018

(87) PCT Pub. No.: WO2017/012415
PCT Pub. Date: Jan. 26, 2017

(65) Prior Publication Data
US 2018/0219984 A1   Aug. 2, 2018

(30) Foreign Application Priority Data

Jul. 17, 2015   (CN) .......................... 2015 1 0425519

(51) Int. Cl.
H04L 29/08 (2006.01)
H04L 29/06 (2006.01)

(52) U.S. Cl.
CPC ............ H04L 69/324 (2013.01); H04L 29/06 (2013.01); H04L 69/22 (2013.01)

(58) Field of Classification Search
CPC ... H04L 43/50; H04L 69/22; G01R 31/31727; G01R 31/3177; G01R 31/318314; G06F 11/2273; G06F 12/0879
See application file for complete search history.

(56) References Cited

U.S. PATENT DOCUMENTS 7,304,996 B1   12/2007   Swenson
8,792,348 B1   7/2014   Channabasappa
(Continued)

FOREIGN PATENT DOCUMENTS

CN   101488820 A   7/2009
CN   100531342 C   8/2009
(Continued)

OTHER PUBLICATIONS

International Search Report in international application No. PCT/CN2016/083907, dated Sep. 5, 2016, 2 pgs.
(Continued)

*Primary Examiner* — Jung H Park
(74) *Attorney, Agent, or Firm* — Ling Wu; Stephen Yang; Ling and Yang Intellectual Property (57) ABSTRACT

Provided are method, apparatus, and computer-readable medium for packet slicing, comprising: performing start of packet (SOP) detection on data packet to obtain first detection result; when first detection result indicates that data packet satisfies condition for inserting first burst control word, inserting first burst control word and filling data control words, each corresponding to interface bit width, in unit of interface bit width; performing intermediate detection on data packet to obtain second detection result; when second detection result indicates that data packet satisfies condition for inserting second burst control word, inserting second burst control word, and filling one or more data control words, each corresponding to interface bit width, in unit of interface bit width; performing packet tail mark detection on data packet to obtain third detection result; and inserting, when third detection result indicates that data packet has packet tail mark, fixed number of idle control words.

13 Claims, 4 Drawing Sheets

(56) References Cited

U.S. PATENT DOCUMENTS

| | | | |
|---|---|---|---|
| 8,943,393 B1* | 1/2015 | Mendel | H04L 1/0072 714/807 |
| 9,065,626 B2 | 6/2015 | Barner | |
| 2004/0252684 A1* | 12/2004 | Evans | H04L 49/30 370/389 |
| 2008/0049774 A1 | 2/2008 | Swenson | |
| 2010/0017654 A1* | 1/2010 | Wishneusky | H02J 1/102 714/15 |
| 2013/0104012 A1* | 4/2013 | Barner | H04L 1/0066 714/807 |

FOREIGN PATENT DOCUMENTS

| | | |
|---|---|---|
| CN | 101924691 A | 12/2010 |
| CN | 103560982 A | 2/2014 |
| CN | 104717152 A | 6/2015 |

OTHER PUBLICATIONS

English Translation of the Written Opinion of the International Search Authority in international application No. PCT/CN2016/083907, dated Sep. 5, 2016, 4 pgs.

"Interlaken Technology: New-Generation Packet Interconnect Protocol", Mar. 2007, Mark Gustlin, Fred Olsson and Matt Weber, Interlaken Technology White Paper, Silicon Logic Engineering, 16 pgs.

Supplementary European Search Report in European application No. 16827106.2, dated Jun. 6, 2018, 5 pgs.

\* cited by examiner

PACKET SLICING METHOD AND APPARATUS, AND COMPUTER-READABLE MEDIUM

TECHNICAL FIELD

The disclosure relates to the field of data communications, and in particular to a method and apparatus, and a computer-readable medium for packet slicing.

BACKGROUND

At present, the Interlaken protocol, serving as an interconnection protocol for implementing high-bandwidth packet transmission, mainly increases a device interconnection bandwidth between communication devices in a manner of setting up a logic connection between devices via multiple serial links. The Interlaken protocol supports extensions, and may support a higher transmission rate by increasing the quantity of serial channels and improving a working frequency of a serial interface.

A traditional Interlaken protocol packet slicing method refers to: segmenting a data packet into data slices of a Maximum size of a data burst (BurstMax) by using an Interlaken burst control word, and filling by using one or more idle control words under the condition that a tail length is smaller than a Minimum interval between Burst Control Words (BurstShort), wherein the BurstMax is associated with an Interlaken user interface bit width, and a size of the BurstMax is also closely associated with an Interlaken Optional Scheduling Enhancement. Therefore, as an Interlaken user interface bit width is increased, a traditional packet slicing method cannot ensure normal operation of the Interlaken Optional Scheduling Enhancement.

In addition, the Interlaken protocol supports Optional Scheduling Enhancement and a supported bandwidth has exceeded 500 Gbps, therefore an Interlaken user interface bit width is required to be more than 2048 bits. In case of such a large bit width interface, how to modify a packet slicing method to break through the limitation of an Interlaken user interface bit width for the BurstMax so as to make Interlaken still support Optional Scheduling Enhancement has become a big problem in a practical application.

SUMMARY

An embodiment of the disclosure provides a method and apparatus, and a computer-readable medium for packet slicing, capable of breaking through the limitation of an Interlaken user interface bit width for a BurstMax.

The technical solution in the embodiment of the disclosure is implemented as follows.

According to a first aspect, the embodiment of the disclosure provides a packet slicing method. The method includes the steps as follows.

A start of packet (SOP) detection is performed on a data packet to obtain a first detection result.

When the first detection result indicates that the data packet satisfies a condition for inserting a first burst control word, the first burst control word is inserted.

Data control words, each corresponding to an interface bit width, are filled in a unit of the interface bit width.

An intermediate detection is performed on the data packet to obtain a second detection result.

When the second detection result indicates that the data packet satisfies a condition for inserting a second burst control word, the second burst control word is inserted, and one or more data control words, each corresponding to an interface bit width, are filled in a unit of the interface bit width.

A packet tail mark detection is performed on the data packet to obtain a third detection result.

When the third detection result indicates that the data packet has a packet tail mark, a fixed number of idle control words are inserted.

In the above solution, the step of performing a first detection on a data packet includes:
detecting whether the data packet carries a packet header mark;
or, detecting whether a channel number of the data packet varies;
or, detecting whether an accumulated data packet length corresponding to the data packet is equal to a BurstMax.

In the above solution, the method may further include:
when it is detected that the data packet carries a packet header mark, the packet header mark is filled.

In the above solution, the step of performing an intermediate detection on the data packet includes:
detecting whether an accumulated data packet length corresponding to the data packet is equal to a BurstMax;
or, detecting whether an optional scheduling enhancement corresponding to the data packet is active.

In the above solution, the method may further include:
when the third detection result indicates that the data packet has a packet tail mark, the packet tail mark is filled.

In the above solution, the method may further include:
after fixed number of idle control words are inserted, one or more idle control words are filled.

According to a second aspect, the embodiment of the disclosure provides a computer-readable medium stored therein computer-executable instructions. When the instructions are executed by at least one processor, the at least one processor is triggered to execute the following operations:
performing a first detection on a data packet to obtain a first detection result;
when the first detection result indicates that the data packet satisfies a condition for inserting a first burst control word, inserting the first burst control word and filling data control words, each corresponding to an interface bit width, in a unit of the interface bit width;
performing an intermediate detection on the data packet to obtain a second detection result;
when the second detection result indicates that the data packet satisfies a condition for inserting a second burst control word, inserting the second burst control word, and filling one or more data control words, each corresponding to an interface bit width, in a unit of the interface bit width;
performing a packet tail mark detection on the data packet to obtain a third detection result; and
inserting, when the third detection result indicates that the data packet has a packet tail mark, fixed number of idle control words.

According to a third aspect, the embodiment of the disclosure also provides a apparatus for packet slicing. The apparatus includes a first detection unit, a second detection unit, a third detection unit and an execution unit.

The first detection unit is configured to perform a first detection on a data packet to obtain a first detection result.

The second detection unit is configured to perform an intermediate detection on the data packet to obtain a second detection result.

The third detection unit is configured to perform a packet tail mark detection on the data packet to obtain a third detection result.

The execution unit is configured to: when the first detection result indicates that the data packet satisfies a condition for inserting a first burst control word, insert the first burst control word and fill data control words, each corresponding to an interface bit width, in a unit of the interface bit width; when the second detection result indicates that the data packet satisfies a condition for inserting a second burst control word, insert the second burst control word and fill one or more data control words, each corresponding to an interface bit width, in a unit of the interface bit width; and when the third detection result indicates that the data packet has a packet tail mark, insert fixed number of idle control words.

In the above solution, the first detection unit includes a first detection subunit, a second detection subunit or a third detection subunit.

The first detection subunit is configured to detect whether the data packet carries a packet header mark.

The second detection subunit is configured to detect whether a channel number of the data packet varies.

The third detection subunit is configured to detect whether an accumulated data packet length corresponding to the data packet is equal to a BurstMax.

In the above solution, the execution unit may be further configured to fill, when the first detection subunit detects that the data packet carries a packet header mark, the packet header mark.

In the above solution, the second detection unit includes a fourth detection subunit or a fifth detection subunit.

The fourth detection subunit is configured to detect whether an accumulated data packet length corresponding to the data packet is equal to a BurstMax.

The fifth detection subunit is configured to detect whether an optional scheduling enhancement corresponding to the data packet is active.

In the above solution, the execution unit may be further configured to fill, when the third detection result indicates that the data packet has a packet tail mark, the packet tail mark.

In the above solution, the execution unit may be further configured to fill one or more idle control words.

The technical solution provided in the embodiment of the disclosure includes: performing a first detection on a data packet to obtain a first detection result; when the first detection result indicates that the data packet satisfies a condition for inserting a first burst control word, inserting, a first burst control word and filling data control words, each corresponding to an interface bit width, in a unit of the interface bit width; performing an intermediate detection on the data packet to obtain a second detection result; when the second detection result indicates that the data packet satisfies a condition for inserting a second burst control word, inserting the second burst control word, and filling one or more data control words, each corresponding to an interface bit width, in a unit of the interface bit width; performing a packet tail mark detection on the data packet to obtain a third detection result; and when the third detection result indicates that the data packet has a packet tail mark, inserting fixed number of idle control words. Thus, the embodiment of the disclosure can break through the limitation of an Interlaken user interface bit width for a BurstMax by slicing a data packet via multiple burst control words, so as to provide an implementation basis for a normal operation of an Interlaken Optional Scheduling Enhancement in a smooth upgrade process of a switching system.

DETAILED DESCRIPTION

In the embodiment of the disclosure, a first detection is performed on a data packet to obtain a first detection result; when the first detection result indicates that the data packet satisfies a condition for inserting a first burst control word, the first burst control word is inserted; data control words, each corresponding to an interface bit width, are filled in a unit of the interface bit width; an intermediate detection is performed on the data packet to obtain a second detection result; when the second detection result indicates that the data packet satisfies a condition for inserting a second burst control word, the second burst control word is inserted, and one or more data control words, each corresponding to an interface bit width, are filled in a unit of the interface bit width; packet tail mark detection is performed on the data packet to obtain a third detection result; and when the third detection result indicates that the data packet has a packet tail mark, fixed number of idle control words are inserted.

The disclosure will be further described in detail below in conjunction with the drawings and specific embodiments.

Figure 1:
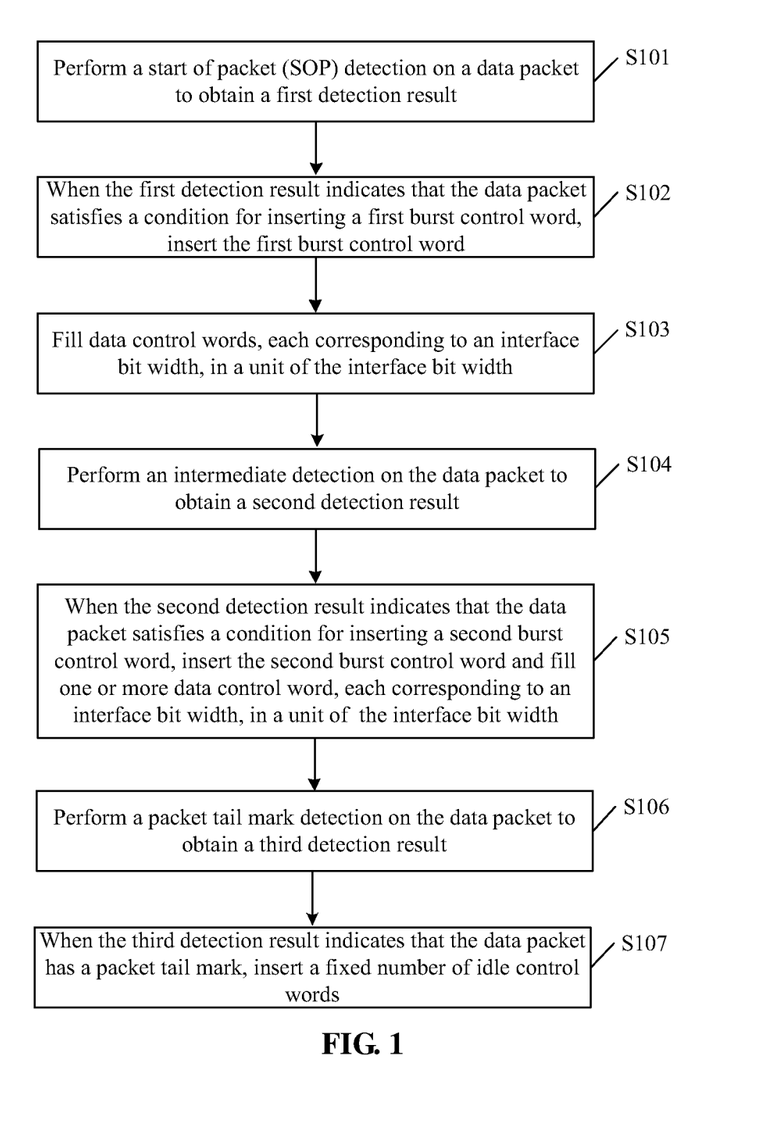
FIG. 1 is an implementation flow diagram of a method for packet slicing according to an embodiment of the disclosure.

FIG. 1 is an implementation flow diagram of a method for packet slicing according to an embodiment of the disclosure. As shown in FIG. 1, the method for slicing packet according to the embodiment of the disclosure includes steps as follows.

In step S101, a first detection is performed on a data packet to obtain a first detection result.

Specifically, the step of performing a first detection on a data packet includes: detecting whether the data packet carries a packet header mark; or, detecting whether a channel number of the data packet varies; or, detecting whether an accumulated data packet length corresponding to the data packet is equal to a BurstMax.

In step S102, when the first detection result indicates that the data packet satisfies a condition for inserting a first burst control word, the first burst control word is inserted.

Herein, the first detection result indicates that the data packet satisfies a condition for inserting a first burst control word that means that the data packet carries a packet header mark; or, a channel number of the data packet varies; or, an accumulated data packet length corresponding to the data packet is equal to a BurstMax.

Correspondingly, when the data packet carries a packet header mark, or a channel number of the data packet varies, or an accumulated data packet length corresponding to the data packet is equal to a BurstMax, a first burst control word is inserted.

In an embodiment, when it is detected that the data packet carries a packet header mark, the method further includes: filling the packet header mark. Specifically, when it is detected that the data packet carries the packet header mark, the packet header mark may be filled whilst the first burst control word is inserted.

In step S103, data control words corresponding to the interface bit width are filled in a unit of an interface bit width.

Specifically, after the first burst control word is inserted, the data control word corresponding to the interface bit width is filled in a unit of an interface bit width. For example, a data packet with a 1024 bits interface bit width corresponds to 16 data control words (8 bytes), so the data control words corresponding to the 1024 bits interface bit width are sequentially filled in a unit of 8 bytes.

In step S104, an intermediate detection is performed on the data packet to obtain a second detection result.

Specifically, the step of performing intermediate detection on the data packet includes: detecting whether an accumulated data packet length corresponding to the data packet is equal to the BurstMax; or, detecting whether an optional scheduling enhancement corresponding to the data packet is active.

In step S105, when the second detection result indicates that the data packet satisfies a condition for inserting a second burst control word, the second burst control word is inserted, and one or more data control words corresponding to the interface bit width are filled in a unit of the interface bit width.

Herein, the second detection result indicates that the data packet satisfies a condition for inserting a second burst control word that means that an accumulated data packet length corresponding to the data packet is equal to a BurstMax, or an optional scheduling enhancement corresponding to the data packet is active.

Correspondingly, when an accumulated data packet length corresponding to the data packet is equal to a BurstMax or an optional scheduling enhancement corresponding to the data packet is active, a second burst control word is inserted, and one or more data control words corresponding to the interface bit width are refilled in a unit of an interface bit width.

In an embodiment, step S104 and step S105 may be executed cyclically according to practical requirements until the data packet has a packet tail mark.

In step S106, a packet tail mark detection is performed on the data packet to obtain a third detection result.

In step S107, when the third detection result indicates that the data packet has a packet tail mark, fixed number of idle control words are inserted.

In an embodiment, when the third detection result indicates that the data packet has a packet tail mark, the method further includes: filling the packet tail mark. Specifically, when the data packet has a packet tail mark, the packet tail mark may be filled whilst the fixed number of idle control words are inserted.

In the embodiment of the disclosure, the method may further include: after the fixed number of control words are inserted, filling one or more idle control words.

Specifically, after the fixed number of control words are inserted, if an accumulated data packet length corresponding to the data packet is smaller than the BurstMax, a supplement process may be performed on the data packet in a manner of filling one or more idle control words such that the accumulated data packet length correspondingly becomes to be equal to the BurstMax.

The method for packet slicing according to the embodiment of the disclosure includes: performing a start of packet detection on a data packet to obtain a first detection result; when the first detection result indicates that the data packet satisfies a condition for inserting a first burst control word, inserting the first burst control word; filling data control words, each corresponding to an interface bit width, in a unit of the interface bit width; performing an intermediate detection on the data packet to obtain a second detection result; inserting, when the second detection result indicates that the data packet satisfies a condition for inserting a second burst control word, the second burst control word, and filling one or more data control words, each corresponding to an interface bit width, in a unit of the interface bit width; performing packet tail mark detection on the data packet to obtain a third detection result; and inserting, when the third detection result indicates that the data packet has a packet tail mark, fixed number of idle control words. Thus, in the embodiment of the disclosure, the data packet is sliced using multiple burst control words, which can break through the limitation of an Interlaken user interface bit width for the BurstMax, so as to provide an implementation basis for normal operation of an Interlaken Optional Scheduling Enhancement in a smooth upgrade process of a switching system.

Figure 2:
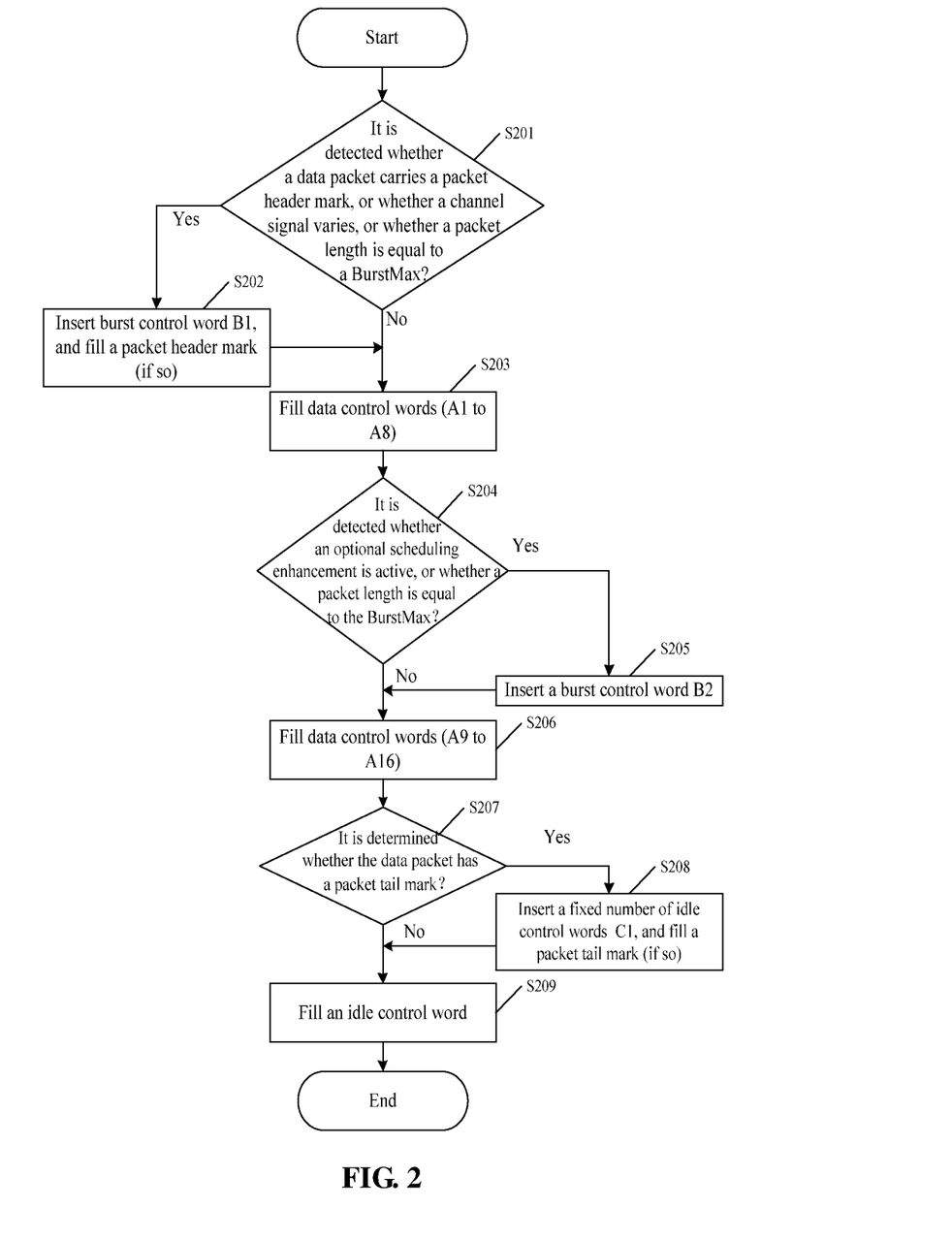
FIG. 2 is a specific implementation flow diagram of a method for packet slicing according to an application example of the disclosure.

FIG. 2 is a specific implementation flow diagram of a method for packet slicing according to an application example of the disclosure. For convenience of description, it is supposed that an interface bit width at an Interlaken user side is 1024 bits, two burst control words are used for packet slicing, where a data packet with a 1024 bits interface bit width corresponds to 16 data control words (8 bytes). As shown in FIG. 2, the method for packet slicing according to an application example of the disclosure includes steps as follows.

In step S201, it is detected whether a data packet carries a packet header mark, or whether a channel number of the data packet varies, or whether an accumulated data packet length corresponding to the data packet is equal to a BurstMax.

Herein, when it is detected that the data packet carries a packet header mark, or a channel number of the data packet varies, or an accumulated data packet length corresponding to the data packet is equal to the BurstMax, step S202 is executed, and otherwise, step S203 is directly executed.

In step S202, a first burst control word B1 is inserted.

Herein, when the data packet carries a packet header mark, it is further required to fill the packet header mark whilst the first burst control word is inserted.

In step S203, data control words A1 to A8 corresponding to the 1024 bits interface bit width are sequentially filled in a unit of 8 bytes.

In step S204, it is detected whether an accumulated data packet length corresponding to the data packet is equal to the BurstMax, or whether an optional scheduling enhancement corresponding to the data packet is active.

Herein, when it is detected that an accumulated data packet length corresponding to the data packet is equal to the BurstMax or an optional scheduling enhancement corresponding to the data packet is active, step S205 is executed, and otherwise, step S206 is directly executed.

In step S205, a second burst control word B2 is inserted.

In step S206, data control words A9 to A16 corresponding to the 1024 bits interface bit width are sequentially filled in a unit of 8 bytes.

In step S207, a packet tail mark detection is performed on the data packet to obtain a third detection result.

Here, when the third detection result indicates that the data packet has a packet tail mark, a step S208 is executed, and otherwise, a step S209 is directly executed.

In step S208, a fixed number of idle control words C1 are inserted.

Herein, it is further required to fill a packet tail mark whilst the fixed number of idle control words C1 are inserted.

In step S209, one or more idle control words are filled.

Specifically, after the fixed number of idle control words are inserted, in order to meet a requirement that packet slicing corresponds to the BurstMax, if an accumulated data packet length corresponding to the data packet is smaller than the BurstMax, a supplement process may be performed on the data packet in a manner of filling one or more idle control words such that the accumulated data packet length correspondingly becomes to be equal to the BurstMax.

Figure 3:
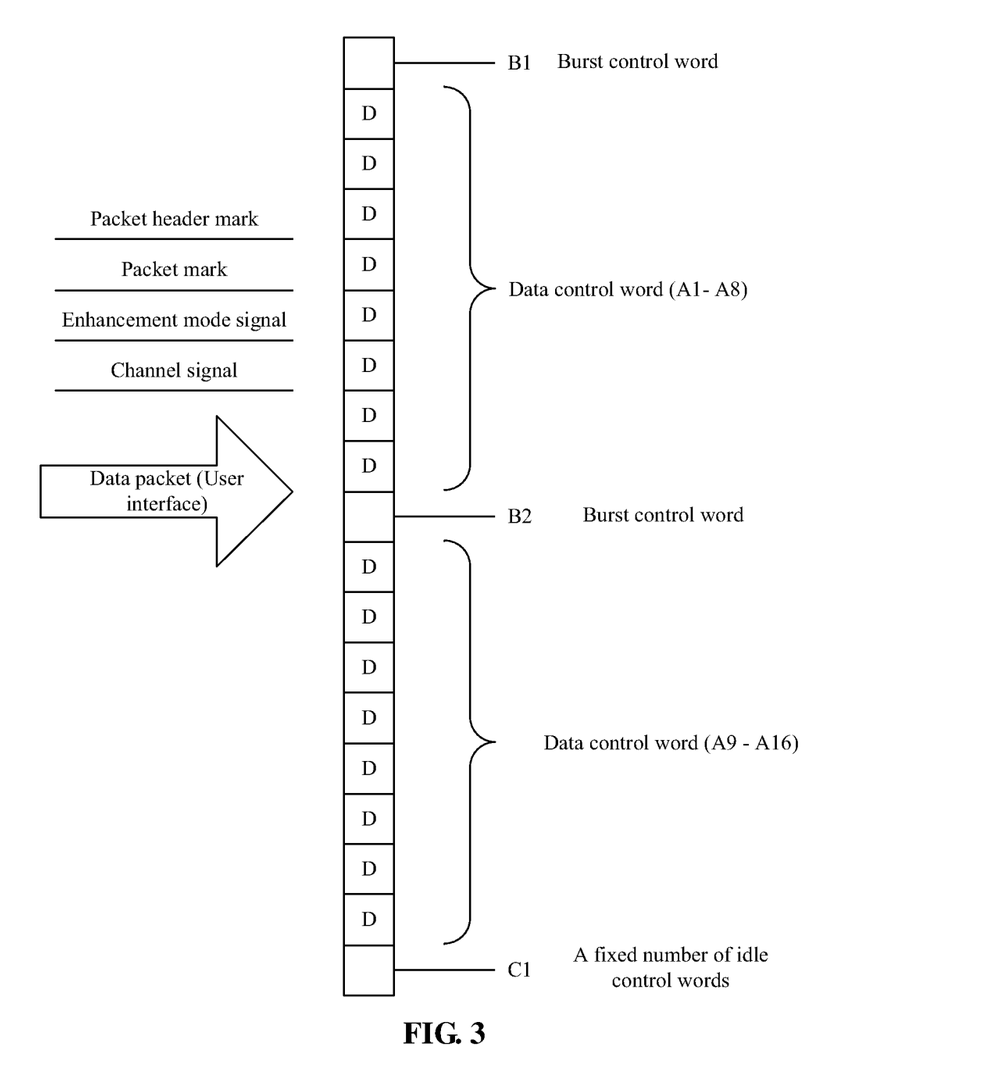
FIG. 3 is an effect diagram of a sliced packet according to an application example of the disclosure.

An effect diagram of a sliced packet as shown in FIG. 3 is obtained by means of the method for packet slicing according to an application example of the disclosure. As shown in FIG. 3, A1 to A16 refer to data control words, B1 and B2 refer to a first burst control word and a second burst control word respectively, and C1 refers fixed number of idle control words. In an example, when an Interlaken data packet corresponds to an enhancement mode of Burst-Max=256 Bytes and BurstMin=128 Bytes and a bus interface bit width is 2048 bit, if a length of the data packet is 257 bytes and Interlaken is performed by two steps by utilizing the packet slicing method in the embodiment of the disclosure, specifically, burst control words are inserted to positions B1 and B2 respectively at the first step, and a control word with fixed number of idle control words C1 are inserted to a packet tail at the second step. If a length of the data packet is 513 bytes and Interlaken is performed by three steps, specifically, a burst control word is inserted to B1 at the first step, burst control words are inserted to positions B1 and B2 respectively at the second step, and fixed number of idle control words C1 are inserted to a packet tail at the third step.

Thus, the limitation of an Interlaken user interface bit width for the BurstMax can be broken through by slicing a data packet via multiple burst control words, so as to provide an implementation basis for a normal operation of an Interlaken Optional Scheduling Enhancement in a smooth upgrade process of a switching system.

Figure 4:
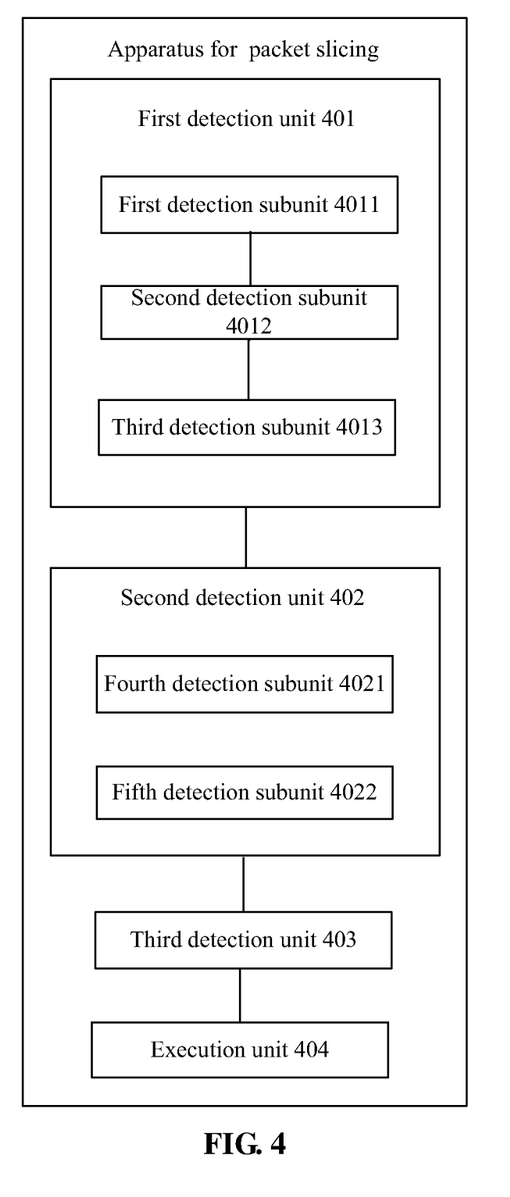
FIG. 4 is a composition structure diagram of an apparatus for packet slicing according to an embodiment of the disclosure.

FIG. 4 is a composition structure diagram of an apparatus for packet slicing according to an embodiment of the disclosure. As shown in FIG. 4, the apparatus for packet slicing includes a first detection unit 401, a second detection unit 402, a third detection unit 403 and an execution unit 404.

The first detection unit 401 is configured to perform a start of packet (SOP) detection on a data packet to obtain a first detection result.

The second detection unit 402 is configured to perform an intermediate detection on the data packet to obtain a second detection result.

The third detection unit 403 is configured to perform a packet tail mark detection on the data packet to obtain a third detection result.

The execution unit 404 is configured to: when the first detection result indicates that the data packet satisfies a condition for inserting a first burst control word, insert a first burst control word and fill data control words corresponding to the interface bit width in a unit of an interface bit width; when the second detection result indicates that the data packet satisfies a condition for inserting a second burst control word, insert a second burst control word and fill one or more data control words corresponding to the interface bit width in a unit of the interface bit width; and when the third detection result indicates that the data packet has a packet tail mark, insert fixed number of idle control words.

In an embodiment, as shown in FIG. 4, the first detection unit 401 includes a first detection subunit 4011, a second detection subunit 4012 or a third detection subunit 4013.

The first detection subunit 4011 is configured to detect whether the data packet carries a packet header mark.

The second detection subunit 4012 is configured to detect whether a channel number of the data packet varies.

The third detection subunit 4013 is configured to detect whether an accumulated data packet length corresponding to the data packet is equal to a BurstMax.

In an embodiment, the execution unit 404 is further configured to: when the first detection subunit detects that the data packet carries a packet header mark, fill the packet header mark.

In an embodiment, the second detection unit 402 includes a fourth detection subunit 4021 or a fifth detection subunit 4022.

The fourth detection subunit 4021 is configured to detect whether an accumulated data packet length corresponding to the data packet is equal to the BurstMax.

The fifth detection subunit 4022 is configured to detect whether an optional scheduling enhancement corresponding to the data packet is active.

In an embodiment, the execution unit 404 is further configured to fill, when the third detection result indicates that the data packet has a packet tail mark, the packet tail mark.

In an embodiment, the execution unit 404 is further configured to fill one or more idle control words.

All units and subunits for constituting the apparatus for packet slicing in the embodiment of the disclosure may be implemented by a processor in the apparatus for packet slicing, or may be implemented by a specific logic circuit. For example, in practical application, the units and subunits may be implemented by a Central Processing Unit (CPU), a Micro-Processor Unit (MPU), a Digital Signal Processor (DSP), or a Field-Programmable Gate Array (FPGA) located in the packet slicing apparatus.

Those skilled in the art shall understand that the embodiment of the disclosure may be provided as a method, a system or a computer program product. Thus, forms of hardware embodiments, software embodiments or embodiments integrating software and hardware may be adopted in the disclosure. Moreover, a form of the computer program product implemented on one or more computer available storage media (including, but are not limited to, a disk memory, an optional memory and the like) containing computer available program codes may be adopted in the disclosure.

The disclosure is described with reference to flowcharts and/or block diagrams of the method, the device (system) and the computer program product according to the embodiments of the disclosure. It will be appreciated that each flow and/or block in the flowcharts and/or the block diagrams and a combination of the flows and/or the blocks in the flowcharts and/or the block diagrams may be implemented by computer program instructions. These computer program instructions may be provided for a general computer, a dedicated computer, an embedded processor or processors of other programmable data processing devices to generate a machine, such that an apparatus for implementing functions designated in one or more flows of the flowcharts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, such that a manufactured product including an instruction apparatus is generated via the instructions stored in the computer readable memory, and the instruction apparatus implements the functions designated in one or more flows of the flowcharts and/or one or more blocks of the block diagrams.

These computer program instructions may also be loaded to the computers or the other programmable data processing devices, such that processing implemented by the computers is generated by executing a series of operation steps on the computers or the other programmable devices, and therefore the instructions executed on the computers or the other programmable devices provide a step of implementing the functions designated in one or more flows of the flowcharts and/or one or more blocks of the block diagrams.

The above is only the preferred embodiments of the disclosure and not intended to limit the scope of protection of the disclosure.

INDUSTRIAL APPLICABILITY

In the embodiment of the disclosure, a start of packet (SOP) detection is performed on a data packet to obtain a first detection result; when the first detection result indicates that the data packet satisfies a condition for inserting a first burst control word, the first burst control word is inserted; data control words, each corresponding to an interface bit width, is filled in a unit of the interface bit width; an intermediate detection is performed on the data packet to obtain a second detection result; when the second detection result indicates that the data packet satisfies a condition for inserting a second burst control word, the second burst control word is inserted, and one or more data control words, each corresponding to an interface bit width, are filled in a unit of the interface bit width; a packet tail mark detection is performed on the data packet to obtain a third detection result; and when the third detection result indicates that the data packet has a packet tail mark, fixed number of idle control words are inserted. Thus, the embodiment of the disclosure can break through the limitation of an Interlaken user interface bit width for a BurstMax by slicing a data packet via multiple burst control words, so as to provide an implementation basis for a normal operation of an Interlaken Optional Scheduling Enhancement in a smooth upgrade process of a switching system.

The invention claimed is:

1. A method for packet slicing, comprising:
performing a start of packet (SOP) detection on a data packet to obtain a first detection result;
when the SOP detection result indicates that the data packet satisfies a condition for inserting a first burst control word, inserting the first burst control word and filling data control words, each corresponding to an interface bit width, in a unit of the interface bit width;
performing an intermediate detection on the data packet to obtain a second detection result;
when the second detection result indicates that the data packet satisfies a condition for inserting a second burst control word, inserting the second burst control word, and filling one or more data control words, each corresponding to an interface bit width, in a unit of the interface bit width;
performing a packet tail mark detection on the data packet to obtain a third detection result; and
inserting, when the third detection result indicates that the data packet has a packet tail mark, a fixed number of idle control words;
wherein the first detection result indicates that the data packet satisfies a condition for inserting a first burst control word, including: the data packet carries a packet header mark; or, a channel number of the data packet varies; or, an accumulated data packet length corresponding to the data packet is equal to a BurstMax,
the second detection result indicates that the data packet satisfies a condition for inserting a second burst control word, including: an optional scheduling enhancement corresponding to the data packet is active.

2. The method according to claim 1, wherein performing an SOP detection on a data packet comprises:
detecting whether the data packet carries a packet header mark;
or, detecting whether a channel number of the data packet varies;
or, detecting whether an accumulated data packet length corresponding to the data packet is equal to a Maximum size of a data burst (BurstMax).

3. The method according to claim 2, wherein the method further comprises:
when detecting that the data packet carries the packet header mark, filling the packet header mark.

4. The method according to claim 1, wherein performing an intermediate detection on the data packet comprises:
detecting whether an optional scheduling enhancement corresponding to the data packet is active.

5. The method according to claim 1, wherein the method further comprises:
when the third detection result indicates that the data packet has a packet tail mark, filling the packet tail mark.

6. The method according to claim 1, wherein the method further comprises:
after inserting the fixed number of idle control words, filling one or more idle control words.

7. A packet slicing apparatus, comprising a processor and a memory, wherein the memory is coupled to the processor for storing a computer readable program, which when executed by the processor causes the processor to:
perform a start of packet (SOP) detection on a data packet to obtain a first detection result;
perform an intermediate detection on the data packet to obtain a second detection result;
perform a packet tail mark detection on the data packet to obtain a third detection result; and
the processor is further configured to: when the first detection result indicates that the data packet satisfies a condition for inserting a first burst control word, insert the first burst control word and fill data control words, each corresponding to an interface bit width, in a unit of the interface bit width; when the second detection result indicates that the data packet satisfies a condition for inserting a second burst control word, insert the second burst control word and fill one or more data control words, each corresponding to an interface bit width, in a unit of the interface bit width; and when the third detection result indicates that the data packet has a packet tail mark, insert fixed number of idle control words;
wherein the first detection result indicates that the data packet satisfies a condition for inserting a first burst control word, including: the data packet carries a packet header mark; or, a channel number of the data packet varies; or, an accumulated data packet length corresponding to the data packet is equal to a BurstMax,
the second detection result indicates that the data packet satisfies a condition for inserting a second burst control word, including: an optional scheduling enhancement corresponding to the data packet is active.

8. The apparatus according to claim 7, wherein the processor is further configured to:
detect whether the data packet carries a packet header mark;
or, detect whether a channel number of the data packet varies;
or, detect whether an accumulated data packet length corresponding to the data packet is equal to a Maximum size of a data burst (BurstMax).

9. The apparatus according to claim 8, wherein
the processor is further configured to fill, when detecting that the data packet carries a packet header mark, the packet header mark.

10. The apparatus according to claim 7, wherein the processor is further configured to:
detect whether an optional scheduling enhancement corresponding to the data packet is active.

11. The apparatus according to claim 7, wherein
the processor is further configured to fill, when the third detection result indicates that the data packet has a packet tail mark, the packet tail mark.

12. The apparatus according to claim 7, wherein the processor is further configured to:
fill one or more idle control words.

13. A non-transitory computer-readable medium stored therein executable instructions that, when executed by a processor, cause the processor to execute a method for packet slicing, the method comprising:
performing a start of packet (SOP) detection on a data packet to obtain a first detection result;

when the SOP detection result indicates that the data packet satisfies a condition for inserting a first burst control word, inserting the first burst control word and filling data control words, each corresponding to an interface bit width, in a unit of the interface bit width;

performing an intermediate detection on the data packet to obtain a second detection result;

when the second detection result indicates that the data packet satisfies a condition for inserting a second burst control word, inserting the second burst control word, and filling one or more data control words, each corresponding to an interface bit width, in a unit of the interface bit width;

performing a packet tail mark detection on the data packet to obtain a third detection result; and inserting, when the third detection result indicates that the data packet has a packet tail mark, a fixed number of idle control words, wherein the first detection result indicates that the data packet satisfies a condition for inserting a first burst control word, including: the data packet carries a packet header mark; or, a channel number of the data packet varies; or, an accumulated data packet length corresponding to the data packet is equal to a BurstMax, the second detection result indicates that the data packet satisfies a condition for inserting a second burst control word, including: an optional scheduling enhancement corresponding to the data packet is active.

* * * * *